Jan. 28, 1958 J. C. TESCULA 2,821,187
CHARCOAL BROILER
Filed May 25, 1953 2 Sheets-Sheet 2
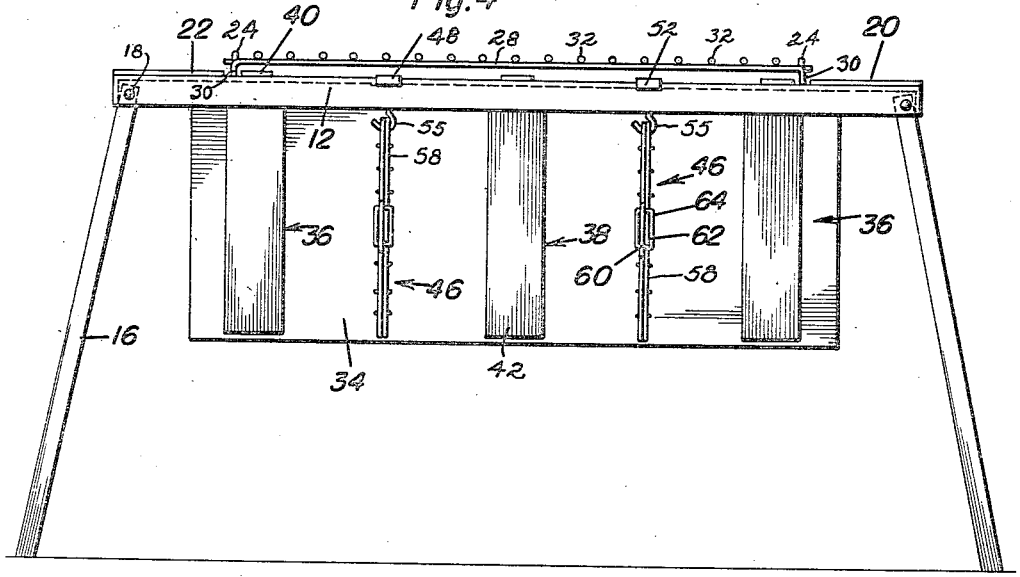
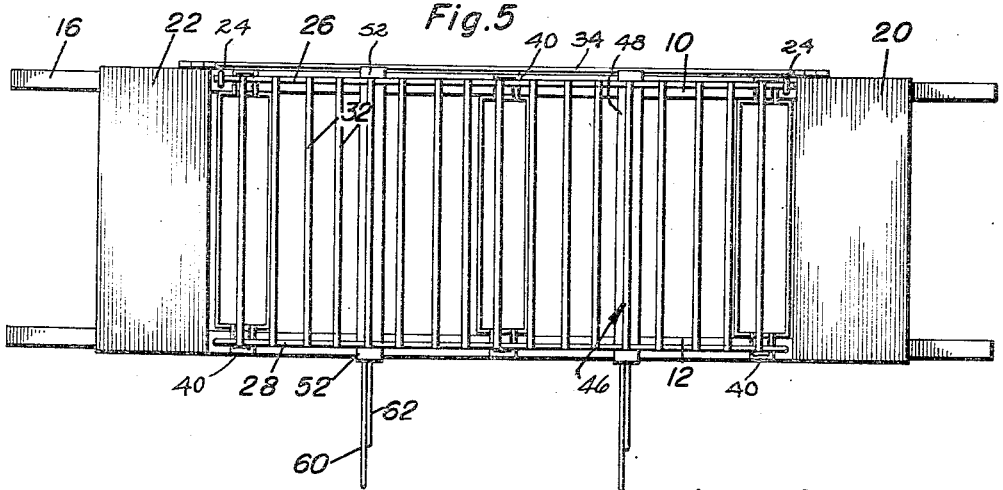
John C. Tescula
INVENTOR.

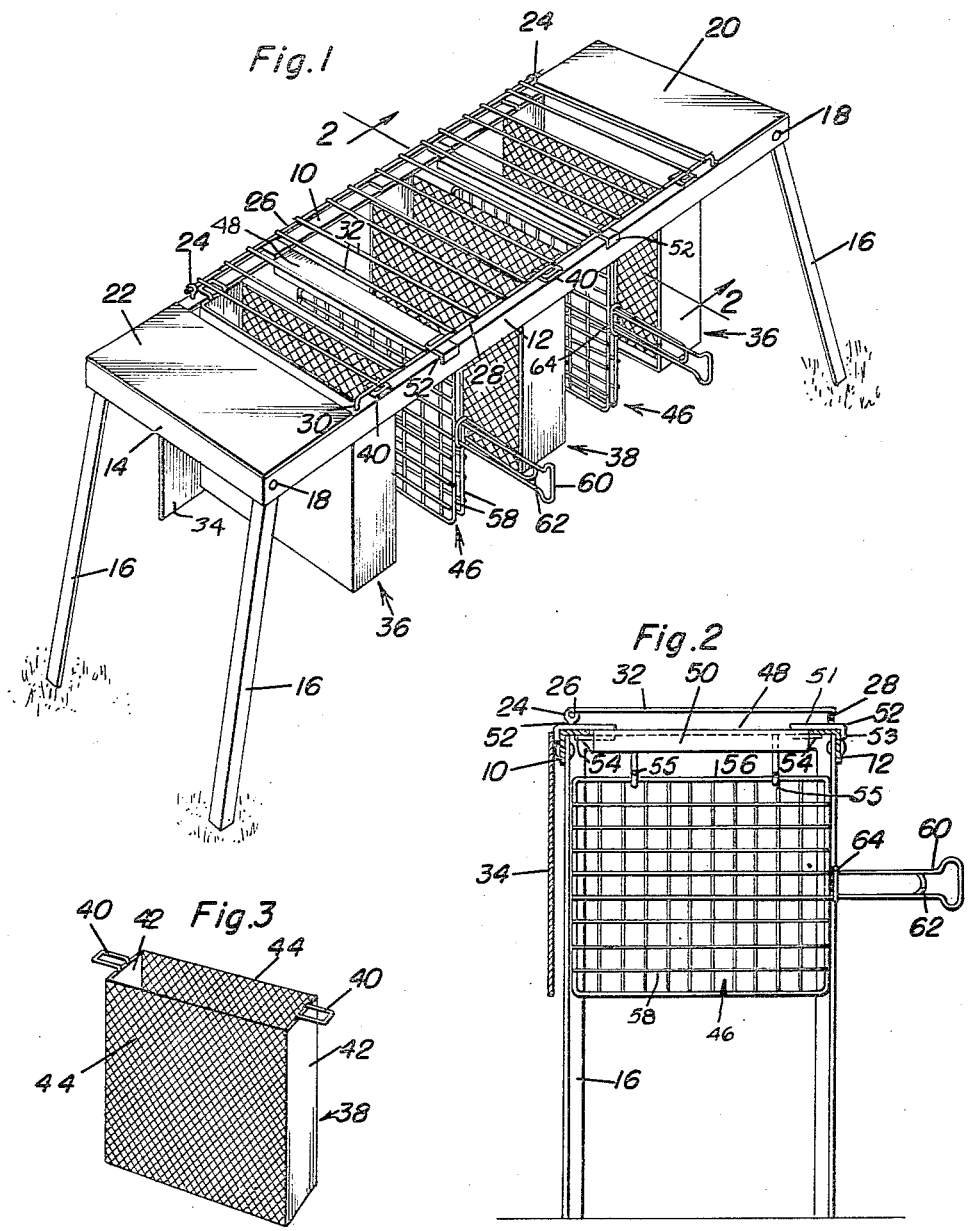

United States Patent Office 2,821,187
Patented Jan. 28, 1958

2,821,187

CHARCOAL BROILER

John C. Tescula, Fairview Park, Ohio

Application May 25, 1953, Serial No. 357,130

2 Claims. (Cl. 126—25)

This invention relates generally to outdoor equipment, and pertains more particularly to an improved form of charcoal broiler.

A primary object of this invention is to provide a collapsible charcoal broiler assembly which is easily transported and which forms in itself a complete broiler assembly for cooking meats and other foods.

Another object of this invention is to provide an improved broiler assembly provided with means for varying the degree and rapidity of cooking.

These together with other objects and advantages which will become subsequently apparent reside in the details of construction and operation as more fully hereinafter described and claimed:

Figure 1 is a perspective view of the broiler assembly;

Figure 2 is a vertical section taken substantially along the plane of section line 2—2 of Figure 1 showing details of the broiler;

Figure 3 is a perspective view of one of the fire pots;

Figure 4 is a side elevation of the broiler assembly on an enlarged scale; and

Figure 5 is a plan view of the assembly shown in Figure 4.

Referring now more particularly to the drawings, the broiler assembly has the general form of an open rectangular frame having the elongated side members 10 and 12 connected by the end members 14, all of these main frame members being of angle configuration. Legs 16 are pivotally secured at each corner of the frame by the pivot pins 18 so that the legs are foldable along the side members to a collapsed position for ease in carrying.

Top plates 20 and 22 may be provided at either end of the frame to serve as supports for utensils or the like, or function as a table. The side frame member 10 is provided with a pair of eyes 24 adjacent its opposite end which receive the stringer 26 of a grill assembly which has an opposed stringer 28 associated with the side frame member 12 with its opposite ends 30 laterally downturned to level the grill. The grill has transverse crosspieces or rods 32 securing the two stringers together.

A deflector and reflector plate 34 is hingedly secured in any desired manner to the side frame member 10 and hangs therebelow. It will be appreciated that this plate is swingable to a position overlying the frame members 10 and 12 when the assembly is to be transported.

A series of charcoal receptacles or fire pots including the end receptacles 36 and any desired number of intermediate receptacles 38 are provided at longitudinally spaced points along the side frame members 10 and 12 and, as seen most clearly in Figure 3, these receptacles are provided at their upper sides with the loop ears 40 which overlie the horizontal leg of the side frame members so that the receptacles are slidably suspended therefrom. The intermediate receptacle shown in Figure 3 is provided with the side plates 42 and the ends 44 which are constructed of open mesh or foraminous material, the receptacles being also provided with a bottom and being open at their top for the reception of charcoal. The end receptacles differ from the intermediate receptacles in that one of their ends is formed of imperforate material to prevent undue loss of heat since the meat or food holding assemblies 46 are disposed only between the receptacles.

Carriers 48 are provided for slidably suspending the meat carrying assemblies from the frame. Carriers 48 are made of an inverted channel member body 50 provided at opposite ends with the generally L-shaped bracket ears 52. The ears 52 are each made of an extension strip 51 with a depending tongue 53. These overlie and engage respectively the side frame members 10 and 12 (Figure 2). The carriers also include the depending bracket ears 54 spaced below the bracket ears 52 so as to prevent disengagement of the carrier assemblies from the frame. Hook members 55 depend from the channel members 50 and receive the upper edges of the grill plates 58 forming a part of the food carrying assembly. These grill plates are hingedly secured together along their lower edges and they have laterally extending handle loops 60 and 62 which, when disposed in the juxtaposed position shown, may be secured together, as by the ring 64.

In use, the assembly is disposed in the position as shown in Figure 1 with the plate 34 on the up-wind side of the assembly so as to prevent too rapid burning of charcoal disposed in the receptacles 36 and 38, the plate also serving to retain the heat generated by the burning charcoal within the confines of the assembly and generally serving to produce more rapid and efficient cooking. The foodstuff to be broiled is placed in the holders 46 and the various assemblies 36, 38 and 46 are disposed at longitudinally spaced points along the frame to provide the desired degree of heating to the foodstuffs, it being apparent that as the charcoal burns down, the spacing should be decreased to assure the same degree of heat.

The grill assembly may be hinged up away from the side frame members at any time to replenish fuel within the charcoal receptacles and this hinging also permits removal of the receptacles for dumping or for merely removing the receptacles for ease in transportation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A charcoal broiler comprising an open rectangular frame having side and end members, legs supporting said frame, a plurality of charcoal receptacles, each of said receptacles including an imperforate bottom wall, a pair of spaced side walls and a laterally projecting ear at the upper edge of each side wall, said ears resting upon the upper surface of the opposite side members of said frame, so that said receptacles are slidably suspended from the frame with the upper edges of said receptacles flush with the top surface of said frame, a carrier slidably carried by said frame side members between a pair of said receptacles and adapted to suspend food holders therefrom, each of said carriers including an elongated body having extension strips at its opposite ends terminating in depending tongues, said strips resting upon the upper surfaces of said frame side members, said tongues contacting the outer edge of said side members, depending bracket ears carried by said elongated body and arranged to contact the undersurface of said members, a pair of hooks depending from said elongated body and adapted to receive meat carriers, a grill assembly hingedly secured to one of said frame side members and overlying said receptacles and carriers, said grill assembly including a plurality of spaced rods rigidly interconnected, a front and a rear stringer, said spaced rods fixed at their ends to said stringers, eyes hingedly connecting said rear stringer to one side member of said frame, the other stringer located adjacent to the opposite side member of said frame, said eyes holding one stringer spaced from the upper surface of said member of said frame to which it is attached and providing a confined space in which at least one of said projecting ears and strips are located, and means at the ends of the other stringer contacting said opposite side member of said frame to hold said other stringer spaced slightly therefrom and provide a confined space in which at least one of said projecting ears and strips are disposed, 2. The broiler of claim 1 and a backdrop deflection plate secured to said frame and disposed behind the receptacles and carrier.

References Cited in the file of this patent

UNITED STATES PATENTS

| | | |
|---|---|---|
| 1,656,181 | Elbert | Jan. 17, 1928 |
| 1,701,033 | Elbert | Feb. 5, 1929 |
| 1,836,894 | Bedigian | Dec. 15, 1931 |
| 2,155,284 | Steenstrup | Apr. 18, 1939 |
| 2,314,772 | Corra | Mar. 23, 1943 |
| 2,335,217 | Tate | Nov. 23, 1943 |
| 2,456,397 | Gallichio | Dec. 14, 1948 |
| 2,540,940 | Ganzer | Feb. 6, 1951 |
| 2,619,951 | Kahn | Dec. 2, 1952 |
| 2,631,579 | Metzger | Mar. 17, 1953 |
| 2,638,888 | Molla | May 19, 1953 |
| 2,690,171 | Riedy | Sept. 28, 1954 |